(12) United States Patent
Crummey et al.

(10) Patent No.: US 6,710,910 B2
(45) Date of Patent: Mar. 23, 2004

(54) OPTICAL AMPLITUDE DEMODULATOR

(75) Inventors: Tom Crummey, London (GB); Richard John Fergusson, Lanarkshire (GB)

(73) Assignee: International Business Machines Corporation, Armonk, NY (US)

(*) Notice: Subject to any disclaimer, the term of this patent is extended or adjusted under 35 U.S.C. 154(b) by 215 days.

(21) Appl. No.: 09/682,417

(22) Filed: Aug. 30, 2001

(65) Prior Publication Data

US 2002/0080468 A1 Jun. 27, 2002

(51) Int. Cl.[7] ................................................. G02F 2/00
(52) U.S. Cl. ............................................................ 359/325
(58) Field of Search ................................. 359/325–332

(56) References Cited

U.S. PATENT DOCUMENTS 5,051,743 A * 9/1991 Orszulak ............... 340/870.04
5,883,548 A * 3/1999 Assard et al. ............... 329/306

* cited by examiner

*Primary Examiner*—John D. Lee
(74) *Attorney, Agent, or Firm*—Ido Tuchman; Derek S. Jennings

(57) ABSTRACT

An optical amplitude demodulator for demodulating signals received from a fiber optic link. The demodulator comprises a plurality of optical sensors for detecting optical output from the fiber optic link, whereby each of the optical sensors has a different detection threshold. Generally, the plurality of optical sensors produce a plurality of digital outputs corresponding to the optical output level detected. A priority encoder encodes the digital outputs into a multi-bit digital signal. Additionally, each of the plurality of optical sensors has an associated optical filter, whereby each of the filters has a different level of opaqueness. Each filter filters received optical output prior to detection by the associated optical sensor.

12 Claims, 17 Drawing Sheets

OPTICAL AMPLITUDE DEMODULATOR

BACKGROUND OF INVENTION

CROSS RELATED CO-PENDING APPLICATIONS

The present application is related to co-pending U.S. patent application (Attorney docket reference GB920000028US1) which discloses a system for transmitting multiple optical levels from an array of transmitter transducers, commonly assigned with the present application.

TECHNICAL FIELD OF THE INVENTION

The present invention relates to fibre optic data links and in particular to the merging of multiple separate input data streams into a single data stream for transmission. More particularly, the present invention relates to the demodulation in the optical domain of a signal for transmission.

BACKGROUND OF THE INVENTION

Prior art methods of data transmission require multiple wire, high cost cables and suffer from limited transfer distance, degraded Front of screen (FOS) performance and Electro-Magnetic Compatibility (EMC) problems. The majority of computer systems at present utilise CRT monitor display systems and it is the analogue nature of the signals required by these display monitors which is responsible for imposing the distance limits over which the data can be delivered. As LCD flat panel monitors become more prevalent, due to decreasing costs, it is no longer required to deliver the data in an analogue format but to use their native digital format for transmission from the PC system unit to the display. Until recently this has been achieved by a double conversion process, firstly digital-analogue and secondly analogue to digital, which allowed the industry standard analogue interface to be used but suffers the problems referred to above and also further signal degradation from the double conversion process.

Fibre optic data links are well known and have the advantages of good noise immunity and high bandwidth. The current technology of fibre optic data links is generally designed for telecommunications applications in which communications over distances of tens of kilometers is required with a very low error rate. Such links are asynchronous digital links having multiple input data streams, and include, for example, ISDN. The data structures in the fibre optic link are very different to that used by the equipment between which communication is taking place by means of the fibre optic link.

Whilst such known fibre optic links work well for telecommunications applications at, for example, 1.0 Gigabits/sec or at 2.4 Gigabits/sec, the cost of the link is high. In telecommunications applications, this cost is shared by the multiple separate pieces of equipment which are using the fibre optic link to communicate.

The benefits of good noise immunity and high bandwidth mean that the use of fibre optic links for non-telecommunications applications is increasing. Such applications are distinguished from telecommunications applications by virtue of the fact that they rarely exceed 150 meters in length and are frequently as short as 2 meters in length. The cost of a telecommunications type of fibre optic link for such an application is between 10 and 100 times too expensive. The physical size of the equipment for a telecommunications fibre optic data link is too large for easy incorporation into a personal computer, computer display or an input/output sensor. When used as a data link from a personal computer to a computer display, the video data that is sent from the personal computer to the computer display can be permitted to have transmission errors, but the synchronisation (or control) signals cannot be permitted to have transmission errors, otherwise the displayed image will break up and the errors will be visible to the end user.

GB Patent Application No. 2339653, discloses an isochronous output data stream format in which a single n bit word is transmitted as m multiple synchronous data streams where the length of the word transmitted in each data stream is n/m, the output data stream containing multiple isochronous different data rate data streams and one or more asynchronous data stream or streams. One bit from each of the m multiple synchronous data streams are combined and transmitted as a single signal at one of 2 m analog levels.

Generally the prior art systems for receiving data in fibre optic systems have problems associated with them including complexity due to several system components being required. This requirement also increases the cost of these systems.

Until recent developments in semiconductor technology, a reliable system has been difficult to achieve. Additionally, all optical receiver systems currently operate in binary and only use a single receiver detector.

SUMMARY OF INVENTION

Accordingly the present invention provides an optical amplitude demodulator for demodulating signals received from a fibre optic link comprising a plurality of optical sensors for detecting optical output from the fibre optic link, each of the optical sensors having a different detection threshold, the plurality of optical sensors producing a plurality of digital outputs corresponding to the optical output level detected, and a priority encoder for encoding the digital outputs into a multi-bit digital signal.

In a preferred embodiment, each of the plurality of optical sensors has an associated optical filter, each of said filters having a different level of opaqueness, for filtering received optical output prior to detection by the optical sensor.

In another preferred embodiment, each of the plurality of optical sensors has a different level of semiconductor diffusion, causing the optical output received by each of said plurality of optical sensors to differ according to the level of diffusion. Since filters are not required, this system is more compact.

In yet another preferred embodiment, the detection thresholds are programmable. This system has benefits namely that the sensors can be configured by the end user and also, non-linear systems are accounted for.

BRIEF DESCRIPTION OF DRAWINGS

Embodiments of the invention will now be described, by way of example, with reference to the accompanying drawings, in which.

DETAILED DESCRIPTION

Figure 1:
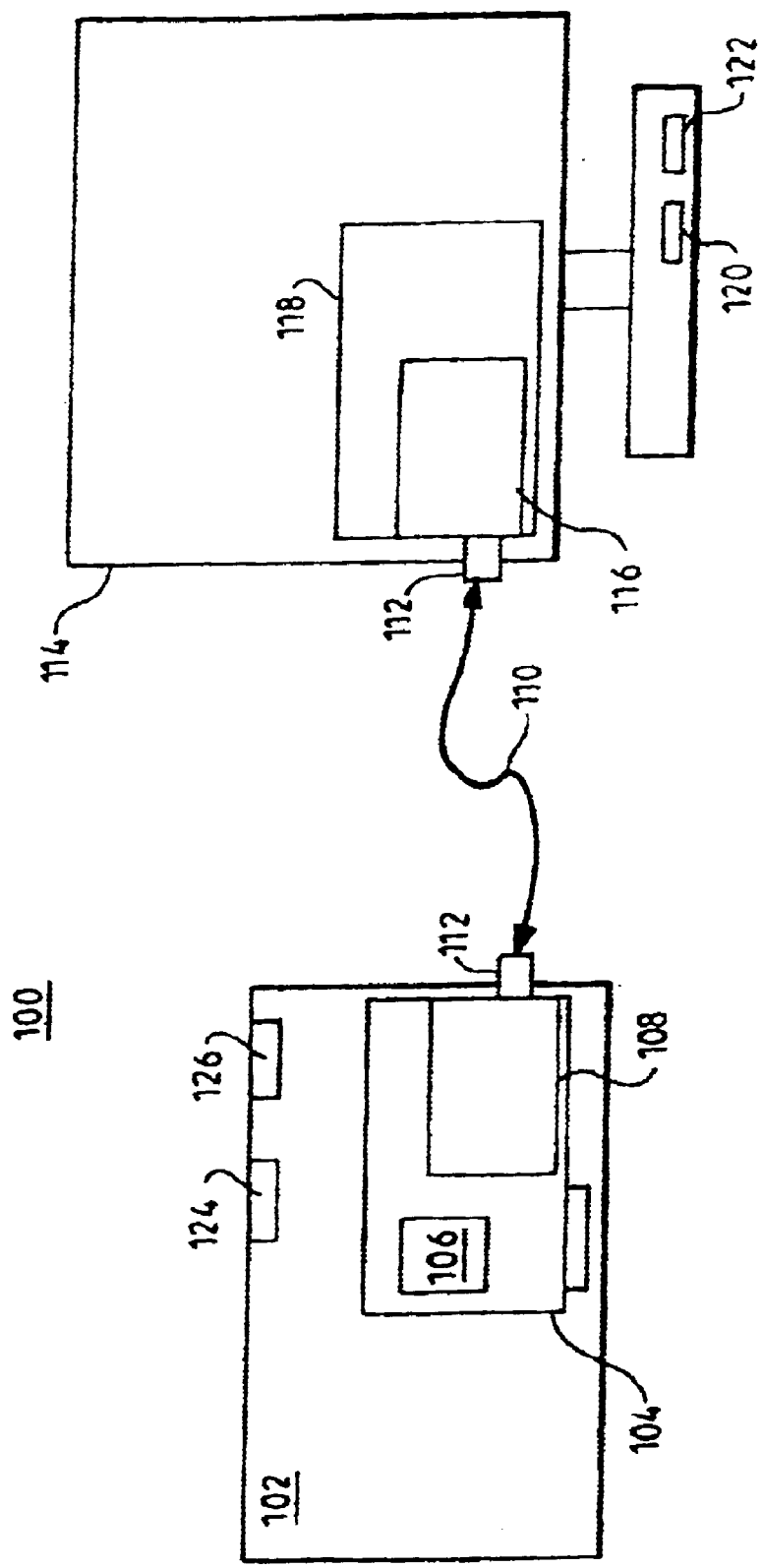
FIG. 1 is a block diagram of a system.

The present invention will be described by way of its application to a communications link between a digital adapter in a personal computer and a digital display device. FIG. 1 shows such a system 100. The personal computer 102 includes an adapter card 104 which is connected to an interface bus in the personal computer, such as, for example, a PCI bus. The type of interface bus between the adapter card and the personal computer is not relevant to the operation of the invention. Additionally, the circuitry which will be described with reference to the adapter card may equally well be located on the same circuit card as the processing circuits of the personal computer without affecting the operation of the invention. The adapter card contains a graphics chip set 106 which provides video information for an attached display 114. The adapter card also contains a data encoder 108 for translating the information from the graphics chip set to a format suitable for optical transmission.

The optical data is then transmitted over a bi-directional optical fibre 110 which typically has a length of 2 to 150 meters. The fibre 110 is connected to the personal computer 102 and to the display 114 by means of optical connectors 112, which may be any industry standard optical connector.

When the optical data is received in the display 114, it is first decoded by a data decoder 116 to decode the optical data into electrical data. The data then passes to a display driver card where it is converted to a format suitable for driving the display. Typically the display is a flat panel display, although the invention is also applicable to displays other than flat panel displays.

The display also has connections for other input and output data streams such as a USB bus connector 120 and an IEEE 1394 serial bus connector 122. Further details of the USB can be found in "Universal Serial Bus Specification, Version 1.0" and further details of the IEEE 1394 bus can be found in "IEEE Standard 1394-1995 for a High Performance Serial Bus" (ISBN 1-55937-583-3).

The data transmitted to the computer display consists of video data which is either used to update a shadow refresh buffer in the computer display or is used to refresh the CRT directly without a shadow refresh buffer. Table 1 shows the data rate requirements for a computer display having a shadow buffer in the display and Table 2 shows the data rate requirements for a computer display not having a shadow buffer in the display. Formats other than those shown in tables 1 and 2 may be used.

TABLE 1

Update rates for computer displays having shadow buffer in the display

| Format | Resolution | Frame Rate Hz | Pixel Clock MHz | Data Rate (Post Palette) (Megabits/sec) | |
|---|---|---|---|---|---|
| | | | | 12 bpp | 24 bpp |
| VGA | 640 × 480 | 60 | 25 | 300 | 600 |
| | 720 × 400 | 70 | 28 | 336 | 672 |
| SVGA | 800 × 600 | 60 | 40 | 480 | 960 |
| XGA | 1024 × 768 | 30 | 23.59 | 283.08 | 566.16 |
| SXGA | 1280 × 1024 | 30 | 40 | 480 | 960 |
| VXGA | 2048 × 2048 | 30 | 120 | 1,444 | 2,888 |
| HDTV | 1280 × 720 | 30 | 27.64 | 331.68 | 663.36 |
| | 1920 × 1080 | 30 | 62.2 | 746.4 | 1,492.8 |

TABLE 2

Refresh rates for computer displays not having a shadow buffer in the display

| Format | Resolution | Frame Rate Hz | Pixel Clock MHz | Data Rate (Post Palette) (Megabits/sec) | |
|---|---|---|---|---|---|
| | | | | 12 bpp | 24 bpp |
| VGA | 640 × 480 | 60 | 25 | 300 | 600 |
| | 720 × 400 | 70 | 28 | 336 | 672 |
| SVGA | 800 × 600 | 60 | 40 | 480 | 960 |
| XGA | 1024 × 768 | 60 | 65 | 780 | 1,560 |
| SXGA | 1280 × 1024 | 60 | 112 | 1,344 | 2,688 |
| UXGA | 1600 × 1200 | 75 | 250 | 3,000 | 6,000 |
| GXGA | 2560 × 2048 | 75 | 384 | 4,600 | 9,200 |
| HDTV | 1280 × 720 | 60 | 77.5 | 930 | 1,860 |
| | 1920 × 1080 | 30(1) | 77.2 | 926.4 | 1,852.8 |

Additionally, control data for the display is transferred to and from the display using the DDC format. Further information on the VESA Data Display Channel (DDC) can be found in "VESA Display Data Channel (DDC) Standard, Version 3".

Figure 2:
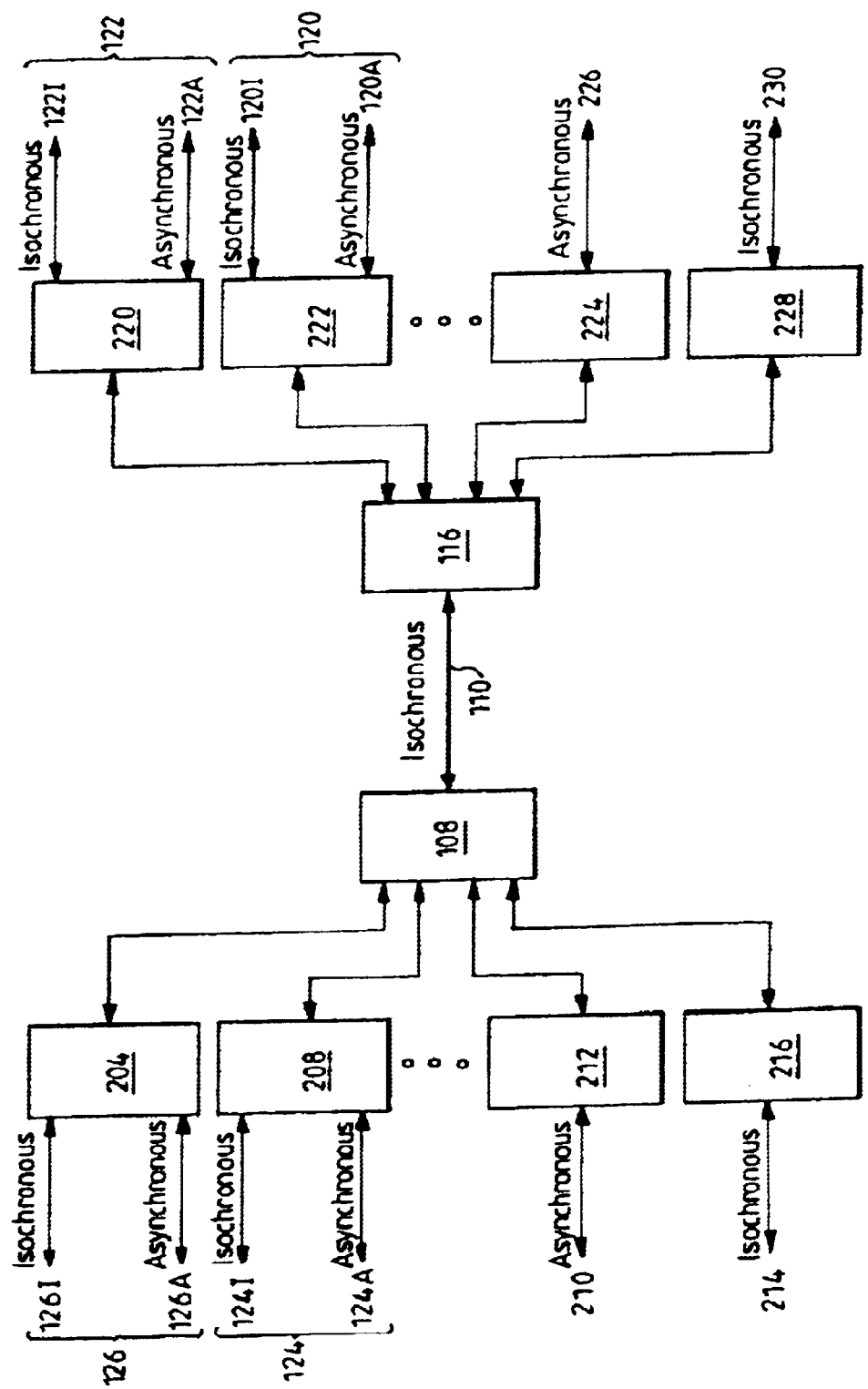
FIG. 2 is a schematic diagram of a system.

FIG. 2 shows a schematic diagram of a system whereby isochronous IEEE 1394 data is received and transmitted (126I) from IEEE 1394 driver circuits 204. Asynchronous IEEE 1394 data is received and transmitted (126A) from IEEE 1394 driver circuits 204. The isochronous and asynchronous data flows from connection 126 through encoder 108, optical link 110 and decoder 116 as isochronous data to IEEE 1394 driver circuit 220, where it is split into isochronous data 122I and asynchronous data 122A. Isochronous and asynchronous USB data 124I, 124A from connection 124 is transferred in a similar fashion to connections 120A and 120I.

Asynchronous data 210 is received and transmitted from DDC driver circuits 212. The asynchronous data flows through encoder 108, optical link 110 and decoder 116 to DDC driver circuit 224, where it is transferred to connector 226.

Isochronous video data 214 from video driver circuits 216 flows through encoder 108, optical link 110 and decoder 116 to video driver circuit 228, where it is transferred to connector 230. In contrast to the IEEE 1394, USB and DDC data, which are all bidirectional, the video data is unidirectional data only. There may be any number of IEEE 1394, USB or DDC channels, further channels being shown in FIG. 2 by the three dots between USB driver 208 and DDC driver 212 and by the three dots between USB driver 222 and DDC driver 224.

Figure 3:
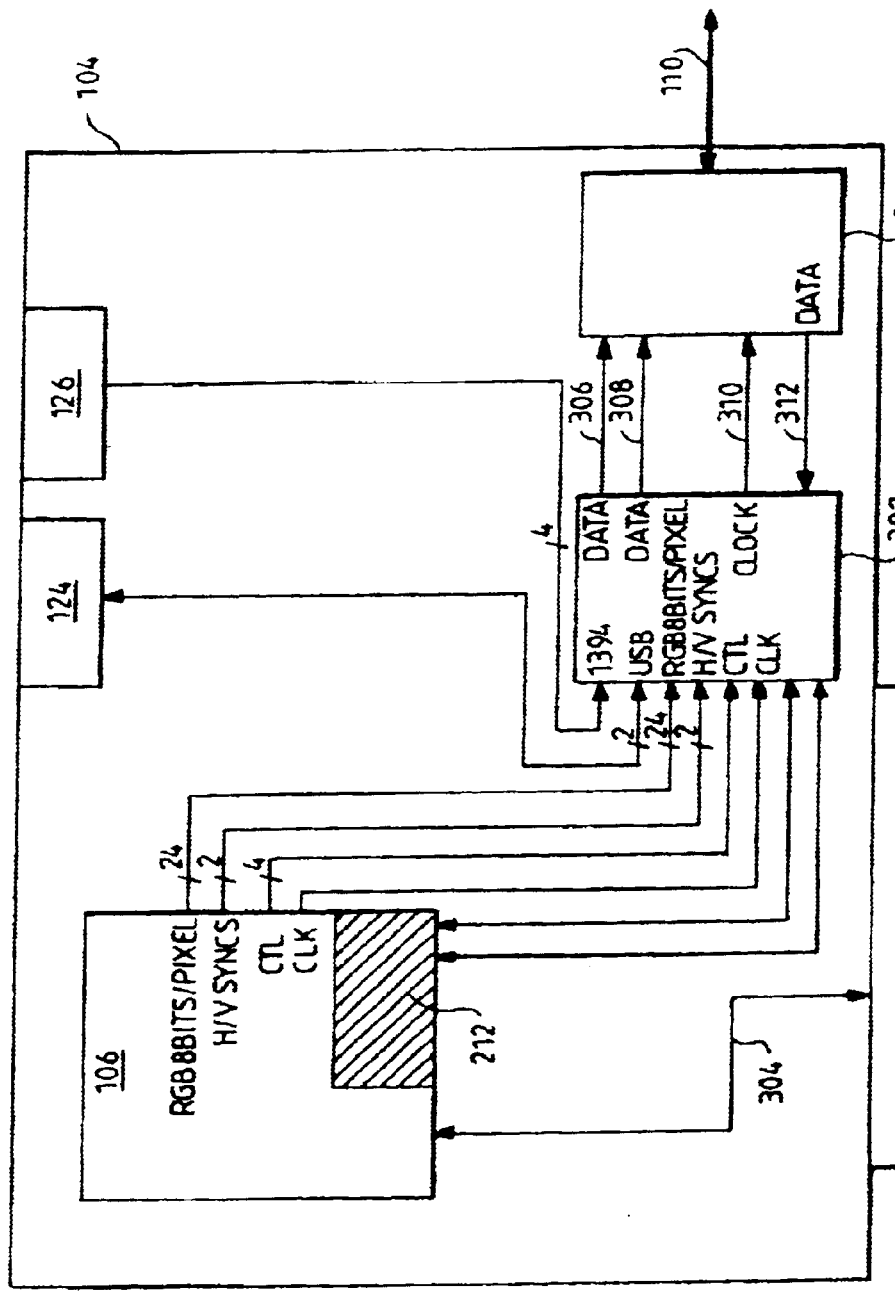
FIG. 3 is a block diagram of an adapter card used in the system of FIG. 1.

FIG. 3 shows a block diagram of an adapter card 104 used in the system of FIG. 1. The adapter card 104 has connections 124 for USB data and 126 for IEEE 1394 data. The graphics chip set 106 produces RGB video data, video control data, display synchronisation signals and a clock signal for use by parallel-serial multiplex encoder 302. These video signals are unidirectional isochronous signals and may be typically 12 bit, 18 bit, 24 bit or 32 bit in format. Other numbers of bits, including numbers greater than 32 bits can also be used. For the purposes of description, 24 bits is used. Parallel-serial multiplex encoder 302 converts the 24 bit signals to 26 bit signals and run-length limits (RLL) them. 18 bit format signals received by the parallel-serial multiplex encoder are converted to 24 bit signals by setting the additional 6 bits to zero. The video control signals are encoded to provide error detection and correction in parallel-serial multiplex encoder 302. The video control signals include Data Good, H and V sync, start of frame, EDID good, no data, cal max and cal min.

Additionally, SDA and SCL data are produced from DDC driver 212 located within the graphics chip set and are received by parallel-serial multiplex encoder 302. The DDC signals are bidirectional, asynchronous signals. Graphics chip set 106 has a connection 304 to the personal computer bus. The personal computer bus could be a PCI bus or an AGP bus. Parallel-serial multiplex encoder 302 also transfers data to and from USB connector 124 and IEEE 1394 connector 126. This USB and IEEE 1394 data can be isochronous or asynchronous data or both and is bidirectional data.

The RLL data codes for digital video data, USB data, IEEE 1394 data, DDC data and control hamming code data are merged clock, embed serialised and then DC balanced as is well known in the art. The merged data is now contained within a n bit word. The value is 32 bits, 24 bits of video data, 5 bits of IEEE 1394 data, 1 bit of USB data and 2 header bits. It is converted from n bit parallel to serial 2 bits wide by multiplexing with pipeline registers to retime the data. The real time bandwidth within the serial data and within the total refresh time slot is allocated isochronously to meet the bus specifications of USB, IEEE 1394 and the data refresh rate requirements.

Parallel-serial multiplex encoder 302 produces 2 bit wide outgoing data signals 306, 308 and an outgoing clock signal 310 for electro-optical converter 314. The n bit encoded word (2 bits wide) is converted to 4 unique light levels at a laser diode, is merged with the return path optical data and is transmitted to fibre optic cable to the display.

Data is received by parallel-serial multiplex encoder 302 from electro-optical converter 314 over connection 312. The return path optical data is converted to binary electrical signals via a pin diode and the clock is recovered in the electro-optical converter 314. The return path data is transferred to parallel-serial multiplex encoder 302 one bit wide where it is decoded into IEEE 1394 data, USB data and DDC data. It is converted from serial to parallel with pipeline registers to retime the data. The IEEE 1394 data, USB data and DDC data are RLL decoded and then separated to their respective original formats. The IEEE 1394 data, USB data and DDC data are converted to their respective specification electrical levels and protocols before being transferred to connectors 126, 124 and the DDC circuitry 212 of graphics chip set 106.

Connections 306, 308, 310 and 312 are preferably implemented using co-axial cable or similar. Alternatively, electro-optical converter 314 is located in the same integrated circuit as parallel-serial multiplex encoder 302 and so there are no cable connections as such, the connection being contained within the integrated circuit. Electro-optical converter 314 supplies and receives optical data to bi-directional optical fibre 110.

Figure 4:
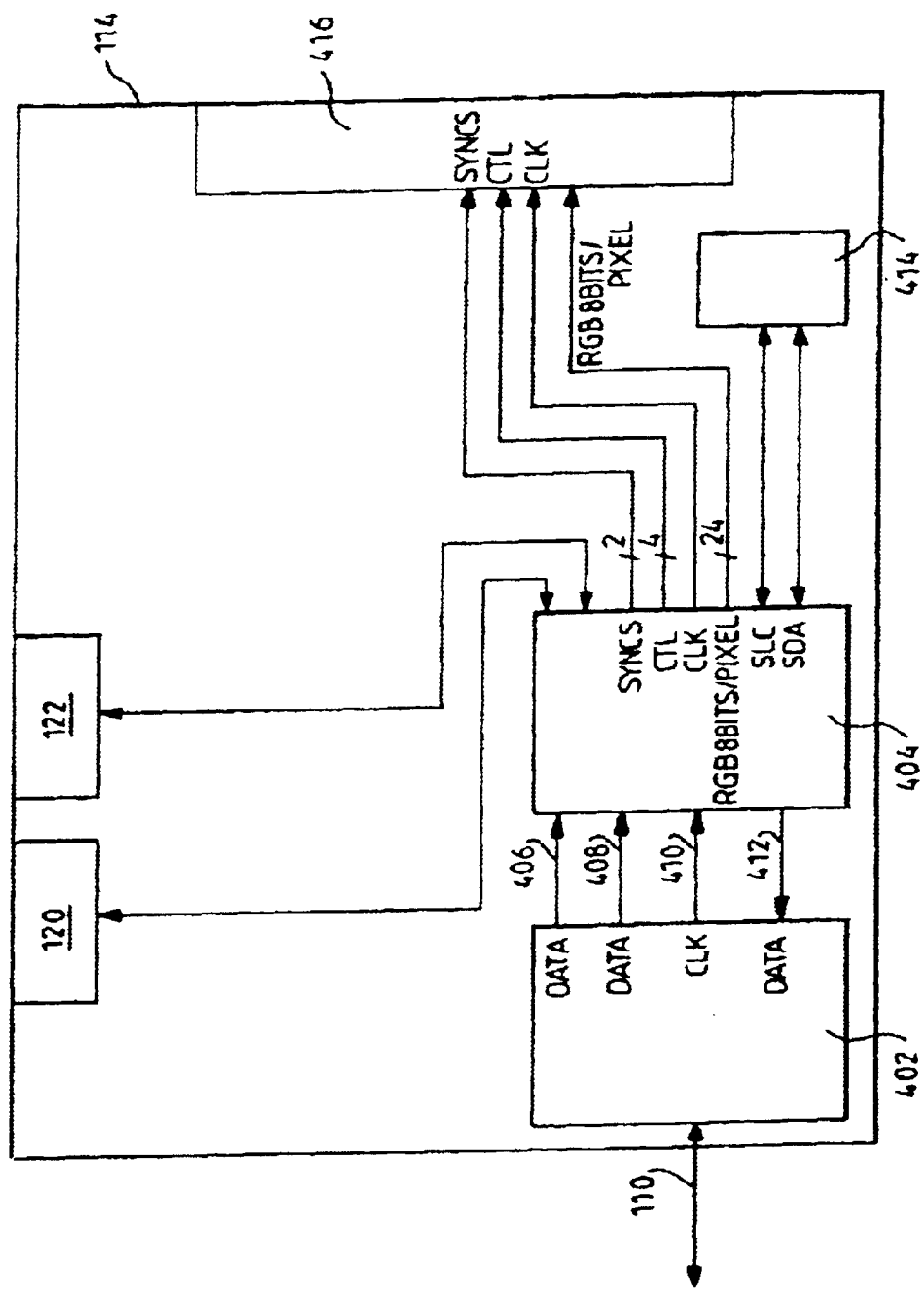
FIG. 4 is a block diagram of a decoder used in the system of FIG. 1.

FIG. 4 shows a block diagram of a decoder used in the system of FIG. 1. Data is received by the optic-fibre receiver circuit 402 from the optical link 110. The receiver circuit 402 converts the data from the optical link 110 from the 4 unique optical light levels to 2 bit wide electrical data signals 406, 408 and a clock signal 410 for the serial-parallel multiplexer 404. The serial-parallel multiplexer 404 converts the n bit data word supplied to it as 2 bit wide electrical data to parallel data with the use of a demultiplexor with pipeline registers to re-time the data without the use of FIFOs. The Synchronisation codes are decoded and error detected and corrected if required. From this decoded data the IEEE 1394 data, USB data, DDC data and Refresh Data Sections of the n-bit data word are separated and RLL decoded back to the original format of the data. The video refresh data with Synchronisation controls is routed to the display connector 408. The USB data is level and protocol converted and is then routed to the USB connector 120. The IEEE 1394 data is level and protocol converted and is then routed to the IEEE 1394 connector 122.

The adapter card 408 has connections 120 for USB data and 122 for IEEE 1394 data. The return path USB data, IEEE 1394 data and DDC data are RLL converted in serial-parallel multiplexer 404 to binary code, transferred over connection 412 and converted to single level optical data in receiver circuit 402. The return path single level optical data is then merged with the incoming four level optical data.

In a variation of the decoder of FIG. 4, a sensor is connected to the personal computer 102. This variation is represented by FIG. 1 but where a sensor replaces the computer display 114. The USB connection 120 and the IEEE 1394 connection 122 remain unchanged. The direction of the unidirectional isochronous data is from the sensor to the personal computer 102, rather than from the personal computer to the computer display 114. DDC data may still be sent from the sensor to the personal computer 102.

Encoding Methods

Figure 5:
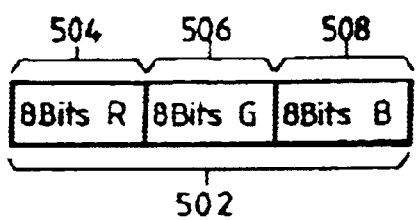
FIG. 5 shows the content of a prior art video data stream.
Figure 6:
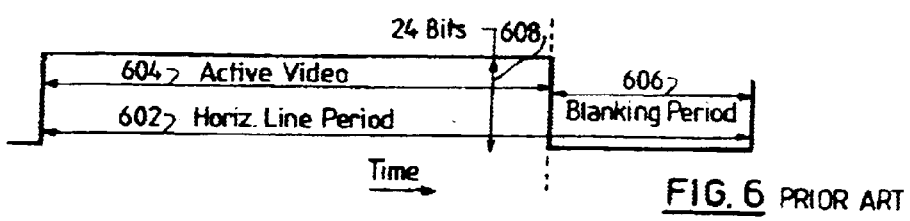
FIG. 6 shows the data that is sent for each horizontal line period of the prior art video data stream of FIG. 5.

FIGS. 5 and 6 show a prior art data stream. Although a 24 bit data word is shown, other prior art systems use 18 bits or 12 bits per pixel formats. These 18 bit and 12 bit prior art data streams can also be used with the encoding format, as well as the 24 bit data stream described.

FIG. 5 shows, at 502, a 24 bit data word, 8 bits of data 504 represented Red video, 8 bits of data 506 representing Green video and 8 bits of data 508 representing Blue video.

In the timeline of FIG. 6, the horizontal line period is represented by line 602 and is the time between consecutive line scans. The active video time is represented by line 604 and the blanking period, during which video is not displayed on the screen is represented by line 606. Line 608 represents that for each displayed pixel, (that is, for each pixel clock period) 24 bits of data are sent.

For each of the data stream formats now described, the data width is increased from the 24 bit width for the raw data to a greater width so as to include items such as bus data (IEEE 1394, USB, DDC), headers, run length limiting, error correction, calibration data and flags.

Figure 7:
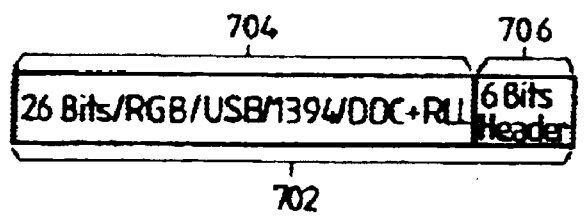
FIG. 7 shows the content of a video data stream using a 32 bit data width.
Figure 8:
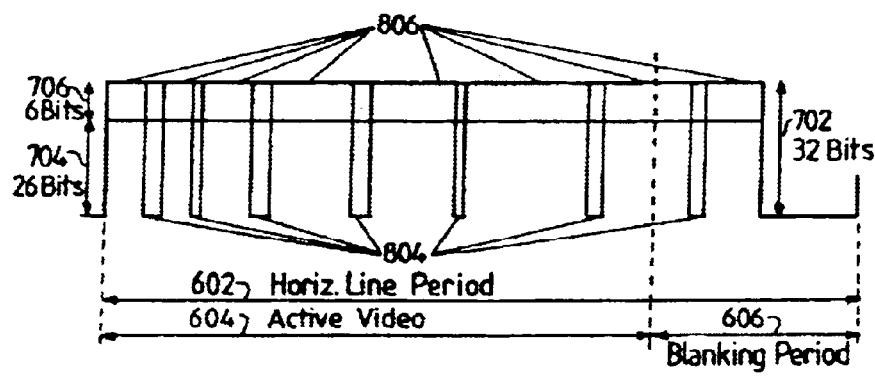
FIG. 8 shows the data that is sent for each horizontal line period of the video data stream of FIG. 7 in which the channel bandwidth is allocated asynchronously on an "as required basis"

FIGS. 7 and 8 show a data stream format which uses a 32 bit data width and the channel bandwidth is allocated asynchronously between video, USB, IEEE 1394 and DDC data on an "as required basis", each data type being indicated by the appropriate header. The video pixel clock remains unaltered causing the video and bus information to spill into blanking period. The video information requires buffering to allow it to be retimed.

FIG. 7 shows, at 702, a 32 bit data width, 26 bits 704 representing Red, Green and Blue video data or USB data or IEEE 1394 data or DDC data as well as RLL data and 6 bits 706 representing header and error correction data. The header identifies which of the various types of data are contained within the 26 bits 704.

In the timeline of FIG. 8, the horizontal line period is represented by line 602 and is the time between consecutive line scans. The line 702 represents that for each displayed pixel, (that is, for each pixel clock period) 32 bits of data are sent, although the data being sent at a given time does not always relate to the particular pixel being displayed at that given time. The 32 bits shown at 702 in FIG. 8 represent the 26 bits of data 704 and the 6 bits of data 706 from FIG. 7. The data shown at 806 represents video information containing Red, Green and Blue video data. The data shown at 804 represents the other data, including USB data, IEEE 1394 data, DDC data as well as RLL data. Time slots are allocated for such data asynchronously, on an "as required basis", with the 6 bit header indicating the type of the data.

Figure 9:
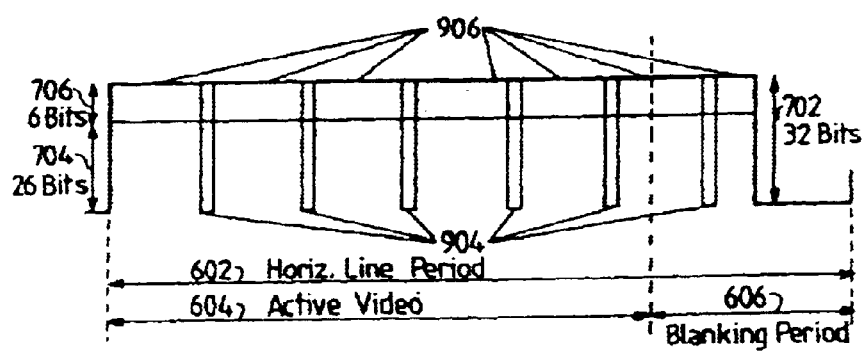
FIG. 9 shows a variation of FIG. 8 in which the bus information is allocated isochronous bandwidths, that is, the channel allocation between bus requirements and video is pre-determined.

FIG. 9 shows a variation of the data stream format of FIGS. 7 and 8 in which the bus information is allocated isochronous bandwidth in order to meet the maximum latency requirement for acknowledgements and lock conditions. As with the data stream format of FIGS. 7 and 8 the video pixel clock remains unaltered and video data spills over into the video blanking period. In addition to the requirements of the data stream formats of FIGS. 7 and 8, data buffering is needed as well as video buffering, however the coding arrangement is reduced in complexity since the location of the data channels in the composite data stream is known. The data shown at 806 represents video information containing Red, Green and Blue video data. The data shown at 804 represents the other data, including USB data, IEEE 1394 data, DDC data as well as RLL data. Time slots are allocated for such data isochronously.

In the first data stream format of FIGS. 7 and 8 and the second data stream format of FIG. 9, the only differentiator is the latency in the data. The advantage inherent in the data stream format of FIG. 9 is that the decoder knows where in the video data stream the bus data lies, whilst in the data stream format of FIGS. 7 and 8, the decoder does not. In the data stream format of the data stream of FIGS. 7 and 8, extra decoding is added to read each header to determine whether a word is video or bus data.

The present invention is an array of optical receivers, whereby multiple light levels of output from optical transmitter transducers is received and encoded as a digital signal for transmission through a single fibre optic cable. An optical transmitter will now be described with reference to FIGS. 10 to 14.

Figure 10:
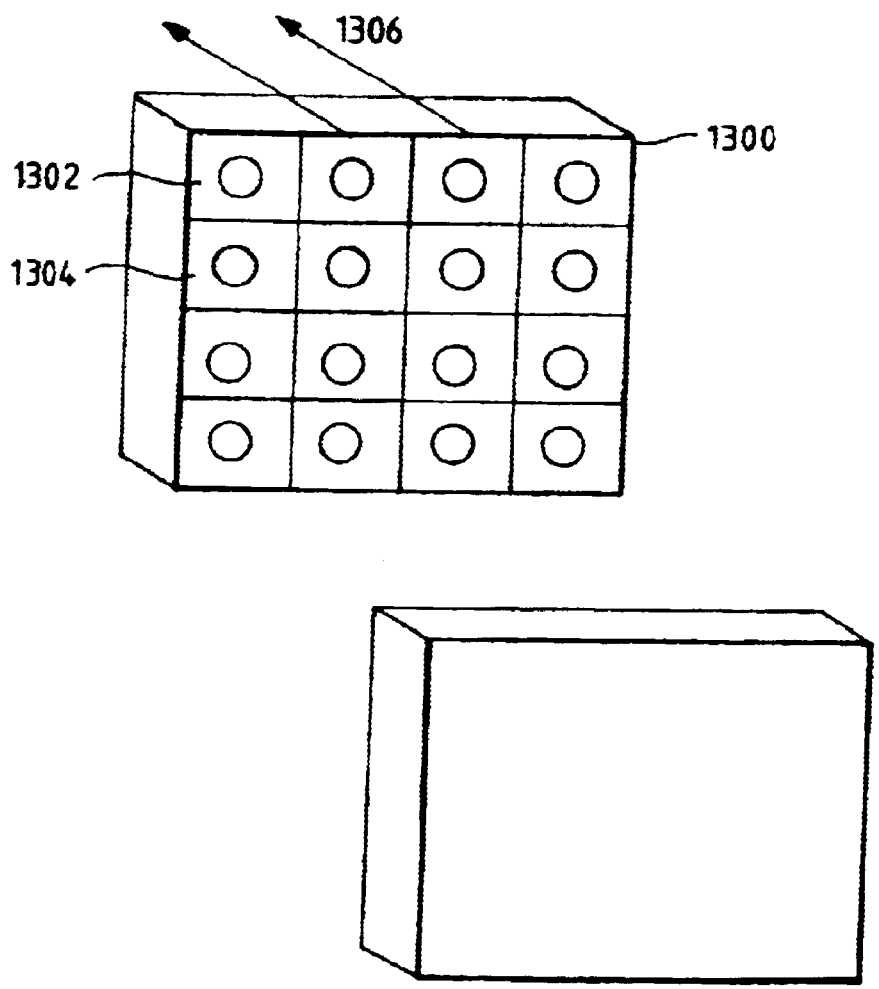
FIG. 10 shows a schematic diagram of a system including an array of multiple, identical optical transmitter transducers.

FIG. 10 shows a schematic diagram of a system, including an array of multiple, identical optical transmitter transducers. The optical transmitter transducers can be any of a number of known devices in the art. For example, the transmitter transducer could well be a linear laser diode, a Fabry Perot laser diode, a Vertical Cavity Surface-Emitting Laser (VCSEL), or alternatively a light emitting diode (LED). However, an artisan of ordinary skill should understand that the transmitter transducers could be implemented in any other way.

In FIG. 10, there is shown a semiconductor device which consists of an array 1300 of sixteen individual optical transmitter transducers, for example shown at 1302 and 1304, mounted in close proximity on a single carrier or integrated in the semiconductor material. The optical transmitter transducers 1300 are identical in that the wavelength of the light output from the transmitter transducers 1300 is the same. The array of optical transmitter transducers 1300 is driven by an electronic circuit 1306.

The light outputs from the array 1300 are combined optically into an optical output signal. The signal is transmitted through a fibre optic link and is detected by a receiver device 1100, as will be described herein with reference to FIGS. 15 to 17.

In FIG. 10, the number of light outputs produced from the transducers varies linearly with the number of transducers implemented. So, for example, if four transmitter transducers were implemented, a total number of four light outputs would be produced, namely three light outputs and dark. Likewise, in the system of FIG. 10, the transmitter transducers 1300 produce one of sixteen light outputs of modulation, including dark. The light outputs are then combined optically to produce an optical output signal. This system has benefits in that it is simple to manufacture identical transmitter transducers and it is also easier to ensure a system is linear.

Figure 11:
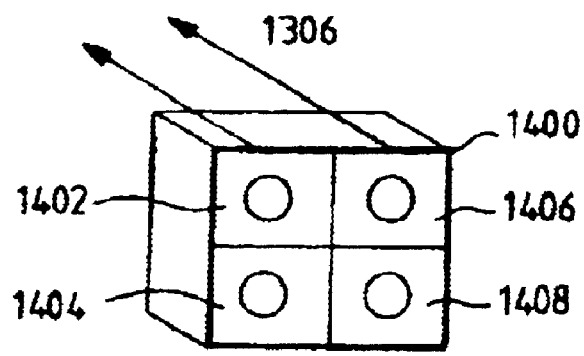
FIG. 11 shows a schematic diagram of a variation of the embodiment of FIG. 10 in which the optical output of the array of optical transmitter transducers is biased.
Figure 11:
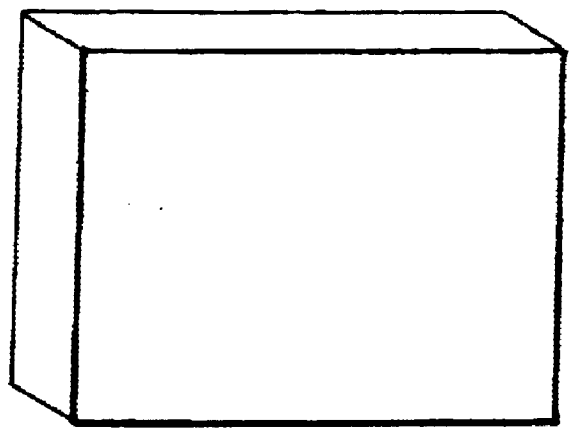

FIG. 11 shows a schematic diagram of a variation of FIG. 10. In this system, the array 1400 consists of four individual transmitter transducers, shown at 1402, 1404, 1406 and 1408. In this case, the different amplitude modulation outputs are achieved by the multiple transmitter transducers 1400 having light outputs biased in factors of powers of two. This achieves individual contributions to the combined optical power.

This biased output can be achieved by pre-setting each transmitter account for system which may be non-linear and also to reduce inter-device non linearity.

For example, in a linear system, transmitter transducers driven with two times the electronic current will produce a proportional light output. However, for example in a non-linear system, transmitter transducers driven with two times the electronic current may produce half as many light outputs. This system is advantageous in situations whereby the light outputs are not required to be directly proportional to the current input.

Figure 12:
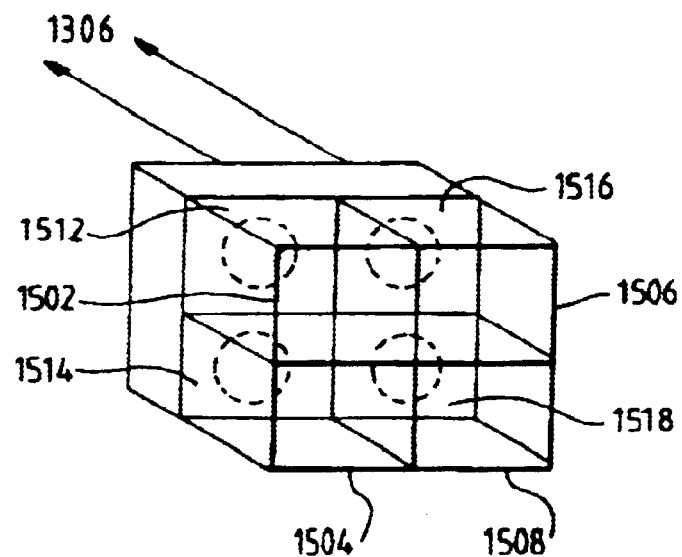
FIG. 12 shows a schematic diagram of an alternative of the embodiments of the systems of FIGS. 10 and 11, of a system including an array of optical transmitter transducers and optical filters.
Figure 12:
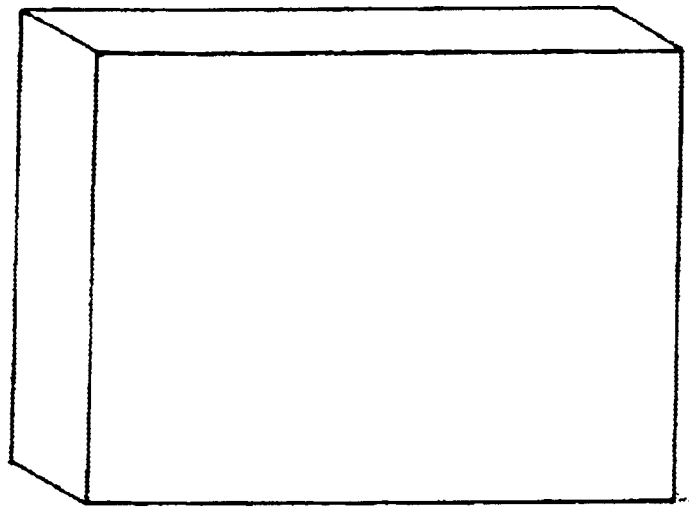

FIG. 12 shows a schematic diagram of a variation of FIGS. 10 and 11. In this system, there is provided an array of multiple, identical optical transmitter transducers. Preferably, the array consists of four individual optical transmitter transducers shown at 1502, 1504, 1506 and 1508. The output of the transmitter transducers is identical and the transmitter transducers are driven by an electronic circuit 1306.

In this system, the light outputs of the array of transmitter transducers are filtered by an array of optical filters. The optical filters are placed in front of each transmitter transducer, as shown at 1512, 1514, 1516 and 1518, each filter consisting of differing levels of opaqueness and hence each filter having a different light transmission.

For example, a first filter 1512 filters out seven eighths of the light output of transmitter transducer 1502. A second filter 1514 filters out three quarters of the light output of transmitter transducer 1504, a third filter 1516 filters out a half of the light output of transmitter transducer 1506 and a fourth filter 1518 filters out none of the light output of transmitter transducer 1508.

In this way, the light outputs from the transmitter transducers are filtered and then combined optically to produce an optical output signal. For example, if the transmitter transducers 1502 and 1506 produce light outputs, then filters 1512 and 1516 filter the light outputs. After filtration a light output of five eighths is produced. The output is then combined and received by a receiver device 1100 as will be described herein.

The system of FIG. 12 results in the number of light outputs produced varying with the opaqueness of the optical filters. In this way, a four-device transmitter is capable of transmitting sixteen light outputs, including dark. This system has benefits in that it is simple to manufacture identical transmitter transducers and since only four transducers are used in a preferred embodiment of the present invention the system is also more compact.

This system is now compared to the prior art method employed in Wavelength Division Multiplexing (WDM). In WDM, the combined output from multiple optical transmitter transducers is the result of differing wavelengths. However the optical output as described above, is the result of transmitter transducers differing in optical power and outputting identical wavelengths.

Problems associated with WDM include the fact that the wavelengths operate at binary levels and to achieve higher data rates, the devices involved use expensive optics gratings to separate individual wavelengths towards separate transmitter transducers.

An alternative of the system shown in FIG. 12 can be achieved by providing diffusion levels in the transmitter transducers rather than implementing physical filters to vary the sensitivity at which transmitter transducers operate. This would be advantageous in that the system would be more compact.

Figure 13:
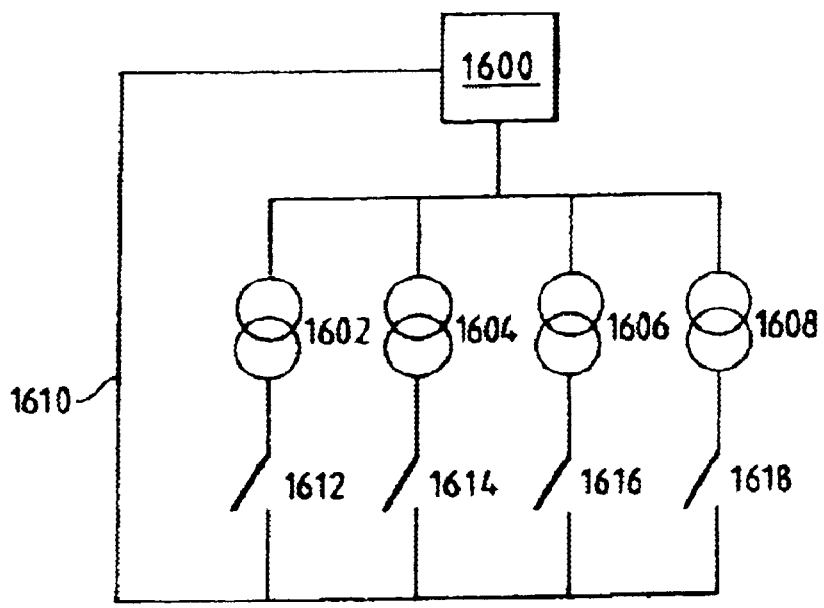
FIG. 13 shows a prior art diagram of an electronic circuit using switching in the transmission of optical output in optical communications.

FIG. 13 shows a diagram of a possible electronic circuit using switching in the transmission of optical output in optical communications. A current flows through the individual transmitter transducer 1600 and through the circuit 1618, implementing joint transmission lines. By implementing the four current sources 1602, 1604, 1606 and 1608 and four switches 1610, 1612, 1614 and 1616, as shown in FIG. 13, the circuit 1618 is capable of producing one of sixteen levels of current outputs.

For example, for discussion purposes, current source 1602 is set to 1 unit of current, current source 1604 is set to 2 units of current, current source 1606 is set to 4 units of current and current source 1606 is set to 8 units of current. Then, enabling and disabling the switching mechanisms produces sixteen possible output currents, all derived from the values of 1, 2, 4 and 8 units of current. Specifically, by enabling switches 1610 and 1612, a current of 3 units is produced. In this way, the circuit 1618 combines the multiple high frequency currents electronically to achieve optical communications.

However, the electronic circuit 1618 of FIG. 13 has problems associated with it in that it is difficult to combine the high frequency currents to drive a single transmitter transducer 1600 with enough noise margin to allow error-free transmission and detection. For example, the enabling and disabling of the switches occurs at a very high frequency and this can contribute to overshoots and jitter.

Figure 14:
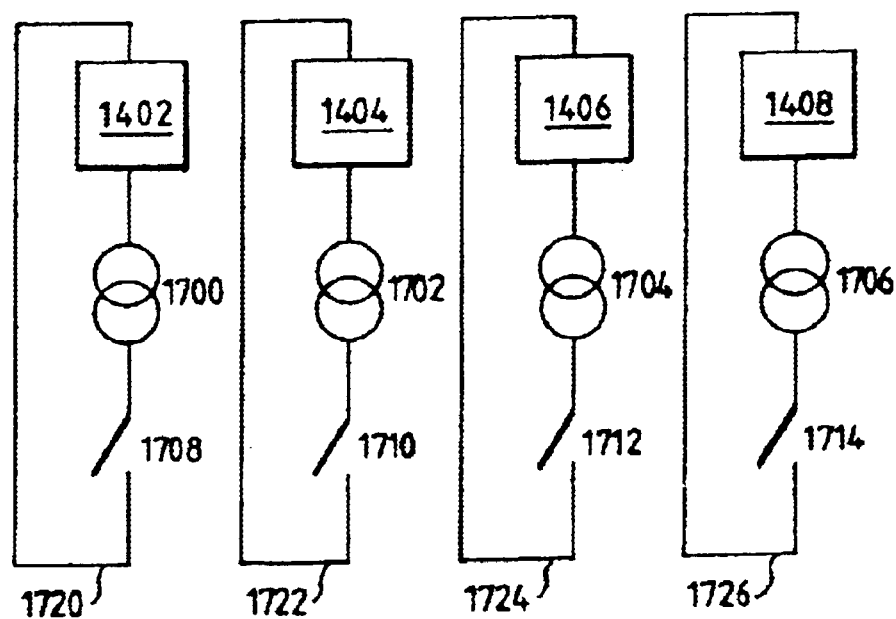
FIG. 14 shows a diagram of an electronic circuit using switching in the transmission of optical output in which multiple level optical communications may be implemented.

These problems are overcome by combining the signals in the optical domain rather than in the electrical domain. FIG. 14 shows a diagram of an electronic circuit 1306 using switching in the transmission of optical output in which multilevel optical communications may be implemented.

Generally, multiple transmitter transducers are implemented, whereby the power of the optical transmitter transducers is biased, as compared with the system of FIG. 13 whereby a single transmitter transducer is implemented. Furthermore, there is provided an electronic circuit for each individual transmitter transducer. In this circuit, the current sources are all set to the same value. Generally, when the switches are enabled and disabled, the transmitter transducers are enabled and disabled accordingly to produce light outputs. Accordingly, there is provided a system for combining the multiple light outputs of the transmitter transducers in an optical domain.

For discussion purposes, the system consists of four individual transmitter transducers, shown at 1402, 1404, 1406 and 1408. In this case, the multiple transmitter transducers have power output biased in factors of the power of two, as in the description associated with FIG. 11.

A current flows through each individual transmitter transducer circuit, 1720, 1722, 1724 and 1726. Current sources 1700, 1702, 1704 and 1706 are set to an identical value, for example 1 unit of current. For discussion purposes, by enabling switches 1712 and 1714, the transmitter transducers 1406 and 1408 are operated. This results in a light output twelve, which is then combined optically into an optical output signal. In this way, the electronic circuits 1720, 1722, 1724 and 1726, combine multiple high frequency currents in an optical domain to achieve multilevel optical communications.

Therefore, by implementing separate transmitter transducers and additionally by combining the light outputs in the optical domain, the problems of matching the transmission lines and signals, associated with combining electrical currents, are overcome. Additionally, unwanted effects such as noise and jitter associated with the high frequency switching in electronic circuits with joint transmission lines are removed.

Furthermore, systems using multiple optical communications have a major advantage over using purely binary systems, in that the transmitter transducers can be operated at considerably lesser switching speeds. For example, by utilising four levels of light outputs, that is three light outputs and dark, the switching speed is reduced by a factor of two. Specifically, in binary systems, if an optical output signal of level three were to be propagated through a fibre optic cable, two bits would be required whereby each bit is set to value 1. However, in multiple optical systems, an optical output signal of value three would be propagated after combining and encoding the outputs. Therefore, the switching speed is reduced by a factor of two. Likewise, eight light outputs will reduce the switching speed by a factor of three and sixteen light outputs will reduce the switching speed by a factor of four and so on. Generally, the digital signal is N bits wide, where N is the number of transmitter transducers, the switching speed is reduced by a factor of N and 2N levels of light output are used.

A further problem with prior art systems is that because optical communication occurs at a high bandwidth, the systems require expensive high-speed drivers and optical devices. For example, presently high data rate optical drivers are implemented with Gallium Arsenide, well known in the prior art, which is expensive. Also, these expensive laser driver circuits are implemented for each optical device, such as for a highly linear and expensive laser diode.

However, an equivalent multilevel system could be implemented for example, with CMOS drivers, also well known in the prior art and considerably lower in cost. Additionally, multiple low cost lasers could be provided to perform the multiple level amplitude modulation of the light.

Also, in the prior art, the matching of the joint electrical transmission lines used to combine the currents and the terminations is difficult and is only possible at a single clock frequency. By utilising the approach of multiple levels of light, the clocking rate of the system is reduced, which in turn allows a high bandwidth system to be implemented utilising lower cost devices.

Figure 15:
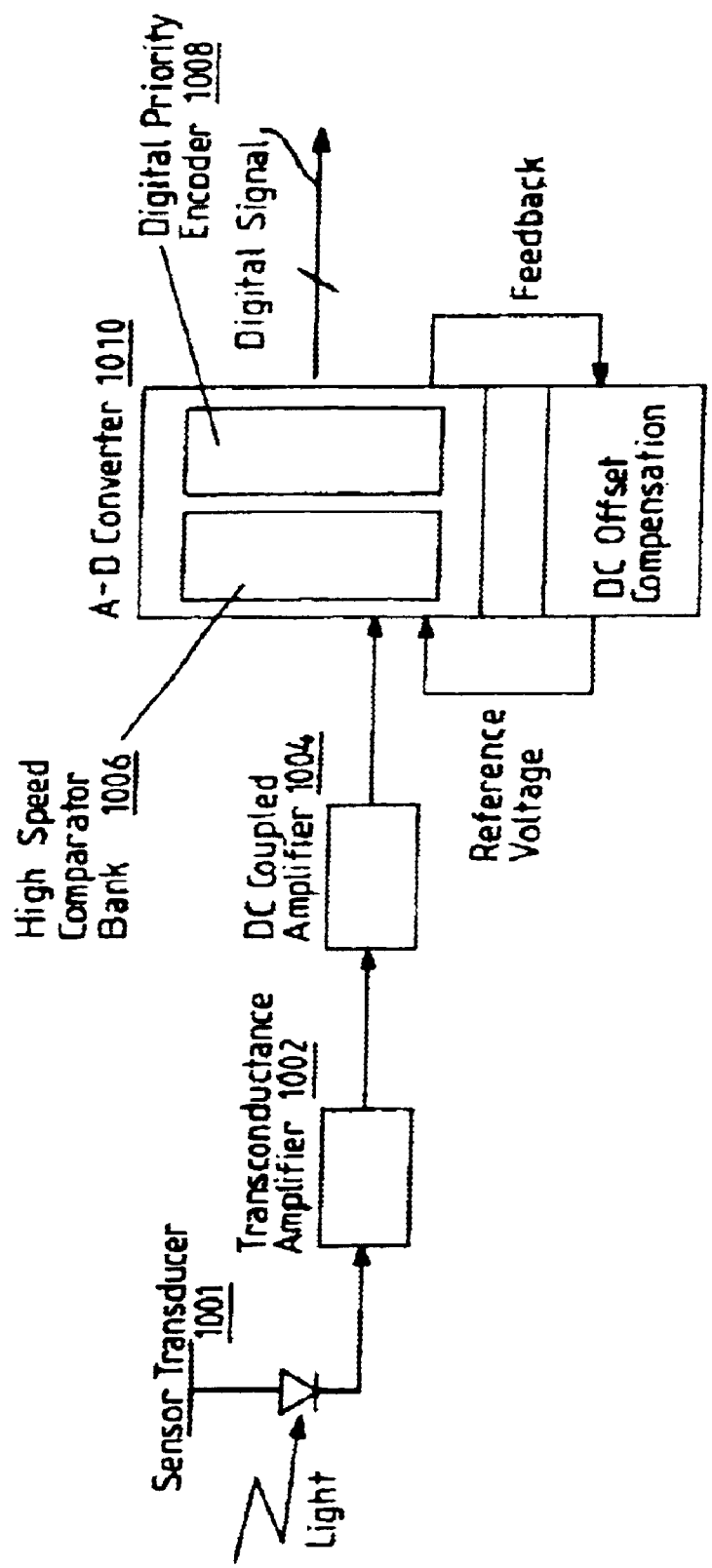
FIG. 15 shows a schematic diagram of a prior art system for receiving optical output.

An improved receiver will now be described with reference to FIGS. 15 to 17. FIG. 15 is a schematic diagram of a prior art system for receiving optical output whereby there is shown a single sensor transducer 1001, a transconductance amplifier 1002, a DC coupled amplifier 1004 and a high-speed analogue to digital converter 1010. Generally, the sensor transducer 1001 receives optical output transmitted from a fibre optic link. The transducer 1001 converts the output into a current, whereby the current is proportional to the amount of light falling on the sensor transducer 1001.

This current is then translated and amplified by the transconductance amplifier 1002 and DC coupled amplifier 1004 into a voltage. The voltage output is sent to the Analogue-Digital Converter (A-D Converter) 1010, consisting of a bank of high-speed comparators 1006 and a priority encoder 1008. The function of the A-D Converter is to convert the voltage and therefore the current into a digital representation of the light falling on the sensor transducer 1001. Typically, in this prior art system it is necessary to remove DC offsets from the DC coupled amplifier which would otherwise cause errors in the A-D output.

Figure 16:
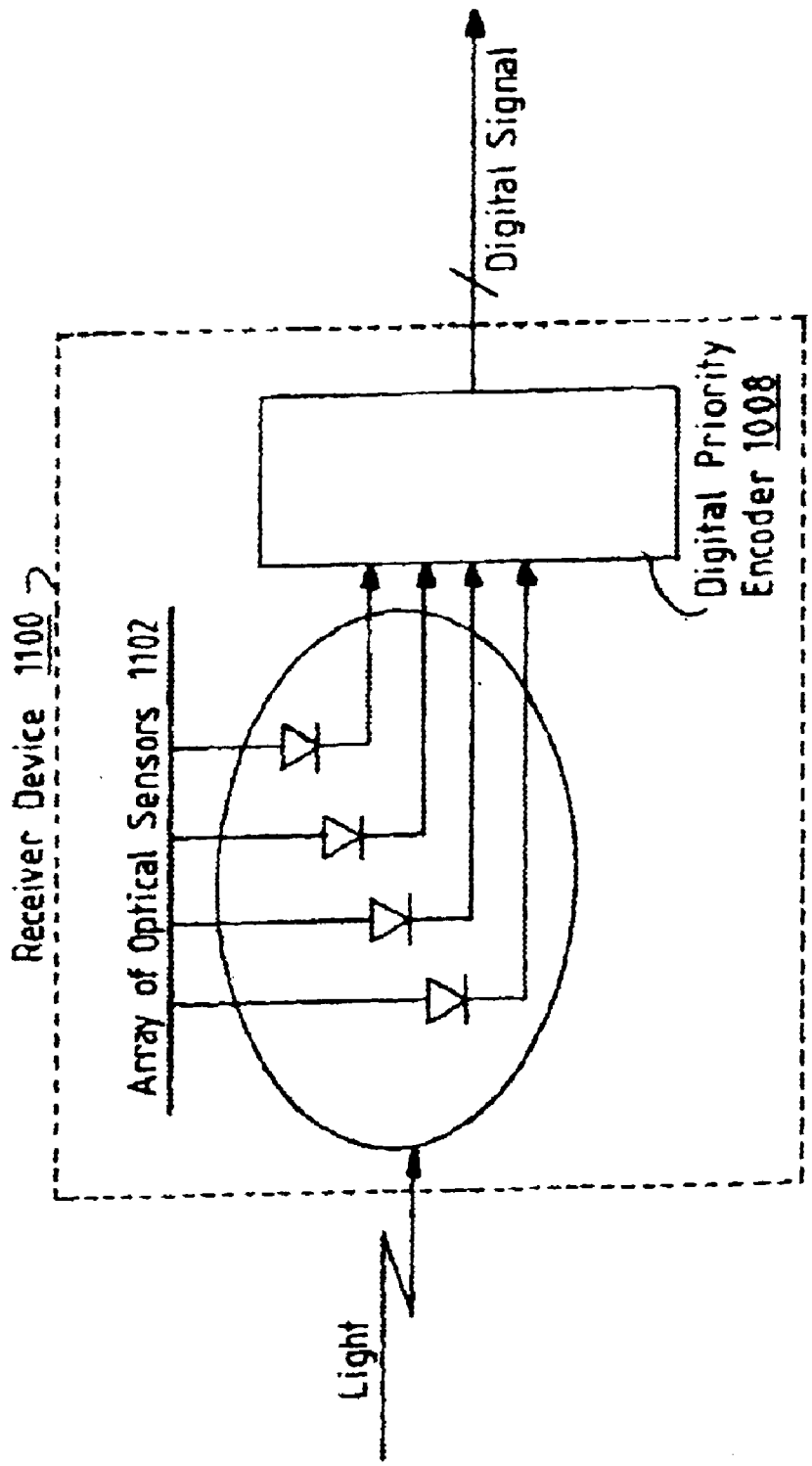
FIG. 16 shows a schematic diagram of an improved system for receiving optical output according to the present invention.

FIG. 16 is a schematic diagram of an improved system for receiving optical output, according to the present invention. As described with reference to FIGS. 10–12 and FIG. 14, optical output is transmitted from an array of optical transmitter transducers through a fibre optic cable. Referring to FIG. 16, there is shown a receiver device 1100. Preferably, the receiver 1100 is a semiconductor device, consisting of an array 1102 of multiple optical sensor transducers mounted in close proximity on a single carrier or integrated in the semiconductor material. Each of the sensor transducers 102 has a different detection threshold. The transducers 1102 detect optical output from the transmitter transducers and produce digital outputs corresponding to the optical output level detected.

Additional functionality is also provided within the receiver 1100, preferably on-chip, for design simplification. Specifically the digital outputs from the sensor transducers 1102 are fed into a priority encoder 1008, a device which is well known in the art. Generally, the encoder 1008 encodes the digital outputs from the transducers 1102 into a multi-bit digital signal. Preferably, the priority encoder 1008 is a 16 line to 4 line digital encoder which receives sixteen bits of information and converts it into four bits of information for transmission, hence reducing the data rate. Thus, the encoder 1008 provides a binary-digital interface, providing a digital representation of the light falling on each sensor transducer.

Therefore, FIG. 16 shows a more compact system than FIG. 15 since several system elements are removed, with the benefits of not only reducing cost and complexity, but also improving the system reliability. For example, the transconductance amplifier 1002 would not be required as the digital outputs from the array 1102 of individual sensor transducers could be used to drive the priority encoder 1008. Likewise, the DC coupled amplifier 1004 would also be made redundant with the added benefit that the DC offset compensation circuits would be unnecessary. As described herein, with reference to FIG. 17, high-speed comparators 1006 are integrated with the sensor transducer array 1102 in the receiver device 1100, therefore removing the need for the A-D converter 1010.

Figure 17:
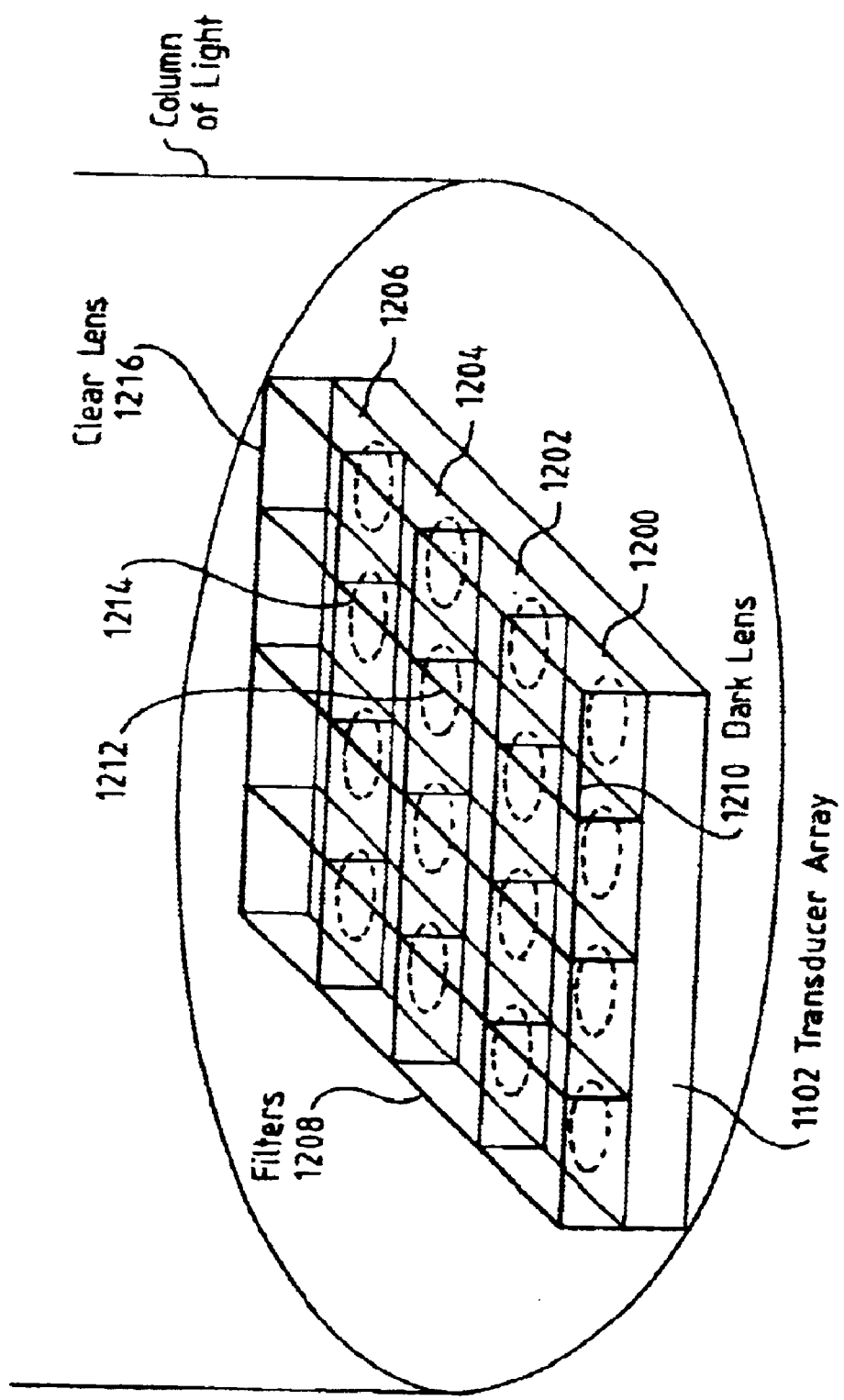
FIG. 17 shows a schematic diagram of a receiver comprising an array of sensor transducers used in the system of FIG. 16.

FIG. 17 is a detailed schematic diagram of an array of sixteen sensor transducers 1102, for example as shown at 1200, 1202, 1204 and 1206, used in the system of FIG. 16. The sensor transducers 1102 can be any of a number of known devices in the art. For example, the sensor transducers 1102 could be PIN diodes, or alternatively, could be PIN transistors. However, an artisan of ordinary skill should understand that the sensor transducers 1102 could be implemented in any other way.

In front of each sensor transducer, is placed a translucent optical filter, for example as shown at 1210, 1212, 1214 and 1216. The filters 1208 have various levels of opaqueness and thus, each sensor transducer has a different detection threshold and operates at a given level of transmitted light.

For example, filter 1210 consists of a dark lens and allows least light through to sensor transducer 1200. Thus, sensor transducer 1200 switches only under conditions where the most amount of light is present. Conversely, filter 1216 consists of a clear lens and allows all available light through to sensor transducer 1206. Thus, sensor transducer 1206 switches only under conditions where the least amount of light is present. The resulting digital outputs from the sensor transducers 1102 are fed into the priority encoder 1008 as described with reference to FIG. 16.

An alternative embodiment of the system shown in FIG. 17 can be achieved by implementing diffusion levels in a sensor transducer rather than by implementing physical lenses and filters to vary the sensitivity at which a sensor transducer operates. This would be advantageous in that the system would be more compact.

An additional alternative embodiment of the present invention, to vary the threshold at which a sensor transducer operates, is to provide on-chip comparators in the receiver 1100. The comparators allow each sensor transducer threshold to be programmed by the end user. Thus, comparators account for systems which may be non-linear and also reduce inter-device non linearity.

Generally, by implementing the systems shown in FIGS. 16 and 17, the benefits include a significant reduction in costs and also improvements in system reliability and performance. Additionally, by having the sensor transducers on the same semiconductor substrate, manufacturing tolerances are minimised and as a consequence the operational differences between devices on the same die are minimised.

The examples above have been used for discussion purposes and an artisan of ordinary skill should understand that the system of the present invention could be implemented in any other way.

What is claimed is:

1. An optical amplitude demodulator for demodulating signals received from a fibre optic link comprising:

a plurality of optical sensors for detecting optical output from the fibre optic link, each of the optical sensors having a different detection threshold, the plurality of optical sensors producing a plurality of digital outputs corresponding to the optical output level detected;

a priority encoder for encoding the digital outputs into a multi-bit digital signal; and wherein each of the plurality of optical sensors has an associated optical filter, each of said filters having a different level of opaqueness, for filtering received optical output prior to detection by the optical sensor.

2. An optical amplitude demodulator as claimed in claim 1 wherein:

the detection thresholds are programmable.

3. An optical amplitude demodulator as claimed in claim 1 wherein:

said plurality of optical sensors comprises $2^N$ individual optical sensors.

4. An optical amplitude demodulator as claimed in claim 3, in which N=4.

5. An optical amplitude demodulator as claimed in claim 1, in which each of said optical sensors is a PIN transistor.

6. An optical amplitude demodulator for demodulating signals received from a fibre optic link comprising:

a plurality of optical sensors for detecting optical output from the fibre optic link, each of the optical sensors having a different detection threshold, the plurality of optical sensors producing a plurality of digital outputs corresponding to the optical output level detected;

a priority encoder for encoding the digital outputs into a multi-bit digital signal; and wherein each of said optical sensors is a PIN diode.

7. An optical amplitude demodulator for demodulating signals received from a fibre optic link comprising:

a plurality of optical sensors for detecting optical output from the fibre optic link, each of the optical sensors having a different detection threshold, the plurality of optical sensors producing a plurality of digital outputs corresponding to the optical output level detected;

a priority encoder for encoding the digital outputs into a multi-bit digital signal; and wherein each of the plurality of optical sensors has a different level of semiconductor diffusion, causing the optical output received by each of said plurality of optical sensors to differ according to the level of diffusion.

8. An optical amplitude demodulator as claimed in claim 7 wherein:

the detection thresholds are programmable.

9. An optical amplitude demodulator as claimed in claim 7 wherein:

said plurality of optical sensors comprises $2^N$ individual optical sensors.

10. An optical amplitude demodulator as claimed in claim 9, in which N=4.

11. An optical amplitude demodulator as claimed in claim 7, in which each of said optical sensors is a PIN diode.

12. An optical amplitude demodulator as claimed in claim 7, in which each of said optical sensors is a PIN transistor.

* * * * *